(12) United States Patent
Tsuchiya et al.

(10) Patent No.: US 10,944,890 B2
(45) Date of Patent: Mar. 9, 2021

(54) INFORMATION PROCESSING APPARATUS, METHOD AND STORAGE MEDIUM THAT GENERATE COLOR MATCHING INFORMATION AND LINE WIDTH CORRECTION INFORMATION

(71) Applicant: CANON KABUSHIKI KAISHA, Tokyo (JP)

(72) Inventors: Okinori Tsuchiya, Yokohama (JP); Kouta Murasawa, Yokohama (JP); Tatsuhiro Yamagata, Inagi (JP); Yugo Mochizuki, Kawasaki (JP); Toshiki Miyazaki, Tokyo (JP); Masao Kato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/580,248

(22) Filed: Sep. 24, 2019

(65) Prior Publication Data

US 2020/0106927 A1    Apr. 2, 2020

(30) Foreign Application Priority Data

Sep. 27, 2018 (JP) .............................. JP2018-181914

(51) Int. Cl.
*H04N 1/60* (2006.01)
(52) U.S. Cl.
CPC ......... *H04N 1/6055* (2013.01); *H04N 1/6025* (2013.01); *H04N 1/6027* (2013.01); *H04N 1/6052* (2013.01); *H04N 1/6072* (2013.01)
(58) Field of Classification Search
CPC combination set(s) only.
See application file for complete search history.

(56) References Cited

U.S. PATENT DOCUMENTS

| 6,825,952 | B1 * | 11/2004 | Lee ........................ G06K 15/02 358/1.9 |
| 7,826,089 | B2 * | 11/2010 | Inoue ................... H04N 1/6055 345/581 |
| 8,817,327 | B2 | 8/2014 | Kamijima |
| 2011/0273746 | A1 * | 11/2011 | Hoshino ............ G06K 15/1835 358/3.06 |
| 2012/0120425 | A1 | 5/2012 | Kamijima |

FOREIGN PATENT DOCUMENTS

JP    2012-108569 A    6/2012

* cited by examiner

*Primary Examiner* — Barbara D Reinier
(74) *Attorney, Agent, or Firm* — Venable LLP

(57) ABSTRACT

An information processing apparatus includes a first acquisition unit to acquire a first color reproduction characteristic indicating first color reproduction color values that indicate a color obtained by reproducing color values by a first printing apparatus, a second acquisition unit to acquire a second color reproduction characteristic indicating second reproduction color values that indicate a color obtained by reproducing color values by a second printing apparatus, a first generation unit to generate color matching information when color matching is performed between the first and second printing apparatuses based on the first and the second color reproduction characteristics, a third acquisition unit to acquire a first line width characteristic of the first printing apparatus, a fourth acquisition unit to acquire a second line width characteristic of the second printing apparatus, and a second generation unit to generate line width correction for correcting an input line width for the second printing apparatus.

23 Claims, 13 Drawing Sheets

| VECTOR DRAWING COMMAND | LINE DRAWING COMMAND | PEN DRAWING INITIALIZATION |
| --- | --- | --- |
| | | PEN DRAWING RANGE SETTING |
| | | PEN SPECIFICATION |
| | | LINE WIDTH SETTING OF PEN |
| | | COLOR SETTING OF PEN |
| | | CONNECTION SHAPE SETTING OF PEN |
| | | MOVE WITHOUT DRAWING |
| | | SINGLE-STROKE DRAWING WHILE MOVING COORDINATE |
| | | LIFT PEN |
| | | FEED PAGE |
| | CHARACTER DRAWING COMMAND | CHARACTER FONT SPECIFICATION |
| | | CHARACTER SPECIFICATION |
| | HATCHING DRAWING COMMAND | HATCHING KIND SPECIFICATION |
| | | HATCHING DENSITY SPECIFICATION |
| BITMAP DRAWING COMMAND | BITMAP DRAWING COMMAND | RASTER DRAWING INITIALIZATION |
| | | COMPRESSION METHOD SPECIFICATION |
| | | RASTER DRAWING RANGE SETTING |
| | | RASTER IMAGE DATA SPECIFICATION |

FIG.4

BASIC LINE IN CAD DRAWING

| THIN LINE [mm] | THICK LINE [mm] | VERY THICK LINE [mm] |
|---|---|---|
| 0.50 | 1.00 | 2.00 |
| 0.35 | 0.70 | 1.40 |
| 0.25 | 0.50 | 1.00 |
| 0.18 | 0.35 | 0.70 |

FIG.6A

REPRESENTATION OF BASIC LINE AT 1,200 [DPI]

| THIN LINE [pixel] | THICK LINE [pixel] | VERY THICK LINE [pixel] |
|---|---|---|
| 24 | 48 | 96 |
| 16 | 32 | 64 |
| 12 | 24 | 48 |
| 6 | 12 | 24 |

FIG.6B

| # | INPUT LINE WIDTH [mm] | PRINTING APPARATUS OUTPUT LINE WIDTH [mm] | TARGET PRINTING APPARATUS OUTPUT LINE WIDTH [mm] | INPUT LINE WIDTH AFTER CORRECTION [mm] |
|---|---|---|---|---|
| 1 | 0.18 | 0.27 | 0.90 | 0.67 |
| 2 | 0.25 | 0.37 | 1.06 | 0.81 |
| 3 | 0.35 | 0.50 | 1.25 | 0.97 |
| 4 | 0.50 | 0.69 | 1.50 | 1.19 |
| 5 | 0.70 | 0.93 | 1.77 | 1.43 |
| 6 | 1.00 | 1.29 | 2.12 | 1.74 |
| 7 | 1.40 | 1.74 | 2.51 | 2.10 |
| 8 | 2.00 | 2.40 | 3.00 | 2.56 |

FIG.10

INFORMATION PROCESSING APPARATUS, METHOD AND STORAGE MEDIUM THAT GENERATE COLOR MATCHING INFORMATION AND LINE WIDTH CORRECTION INFORMATION

This application claims the benefit of Japanese Patent Application No. 2018-181914, filed Sep. 27, 2018, which is hereby incorporated by reference herein in its entirety.

BACKGROUND OF THE INVENTION

Field of the Invention

The present disclosure relates to a technique to match outputs between printing apparatuses.

Description of the Related Art

Conventionally, there is a system in which a drawing command is acquired from computer aided design (CAD) data created by making use of CAD application software, bitmap data including a line drawn in accordance with the drawing command is generated, and an image is printed on a printing medium based on the bitmap data. In a drawing created by CAD application software, drawing information is described by the thickness of a line and as the case may be, color classification of lines including light and shade, such as gray and black, and color classification of solid-painted portions.

Conventionally, in a case when a drawing created by CAD application software for printing by a certain printing apparatus is printed by another printing apparatus, there is such a problem that an erroneous read of the drawing by a user is induced because the width and color of the line drawn within the drawing are different depending on the model of the printing apparatus.

In order to solve this problem, according to Japanese Patent Laid-Open No. 2012-108569, a combination of a line width and a color is converted before acquiring a drawing command for drawing a line and performing printing by a printing apparatus by generating image data including the line specified in the acquired drawing command. Specifically, the combination of the line width and the color specified in the drawing command is converted so that the average density of the results of printing a line by the printing apparatus used for outputting coincides with the average density of the results of printing the line by a target printing apparatus (called a target printer, and the like).

SUMMARY OF THE INVENTION

However, according to Japanese Patent Laid-Open No. 2012-108569, it is possible to match the apparent impression of the density and width of a line by matching the average density of the target printing apparatus with that of the printing apparatus, but there is a case when the line width itself is shifted.

Consequently, in view of the above-described problem, an object of the present disclosure is to highly accurately match both the color and the line width on printed matter printed by each of a plurality of printing apparatuses based on identical image data.

One embodiment of the present invention is an information processing apparatus including a first acquisition unit configured to acquire a color developing characteristic in image printing by a first printing apparatus, a second acquisition unit configured to acquire a color developing characteristic in image printing by a second printing apparatus, a table generation unit configured to generate a color matching table used in a case when color matching is performed between the first printing apparatus and the second printing apparatus based on the acquired color developing characteristic of the first printing apparatus and the acquired color developing characteristic of the second printing apparatus, a third acquisition unit configured to acquire a line width characteristic of the first printing apparatus, a fourth acquisition unit configured to acquire a line width characteristic of the second printing apparatus for which color matching has been performed by using the color matching table, and a correction unit configured to correct an input line width for the second printing apparatus based on the acquired line width characteristic of the first printing apparatus and the acquired line width characteristic of the second printing apparatus.

Further features of the present invention will become apparent from the following description of exemplary embodiments with reference to the attached drawings.

BRIEF DESCRIPTION OF THE DRAWINGS

FIG. 4 is a diagram explaining details of a drawing command.

FIG. 6A and FIG. 6B are each a table storing data relating to basic lines used in a CAD drawing.

FIG. 10 is a table storing input line widths before correction, output line widths of each of a printing apparatus and a target printing apparatus, and input line widths after correction.

DESCRIPTION OF THE EMBODIMENTS

In the following, with reference to the drawings, preferred embodiments of the present disclosure are explained in detail. However, the contents described in the following are merely exemplary and not intended to limit the scope of the present disclosure only to those.

First Embodiment

Figure 1:
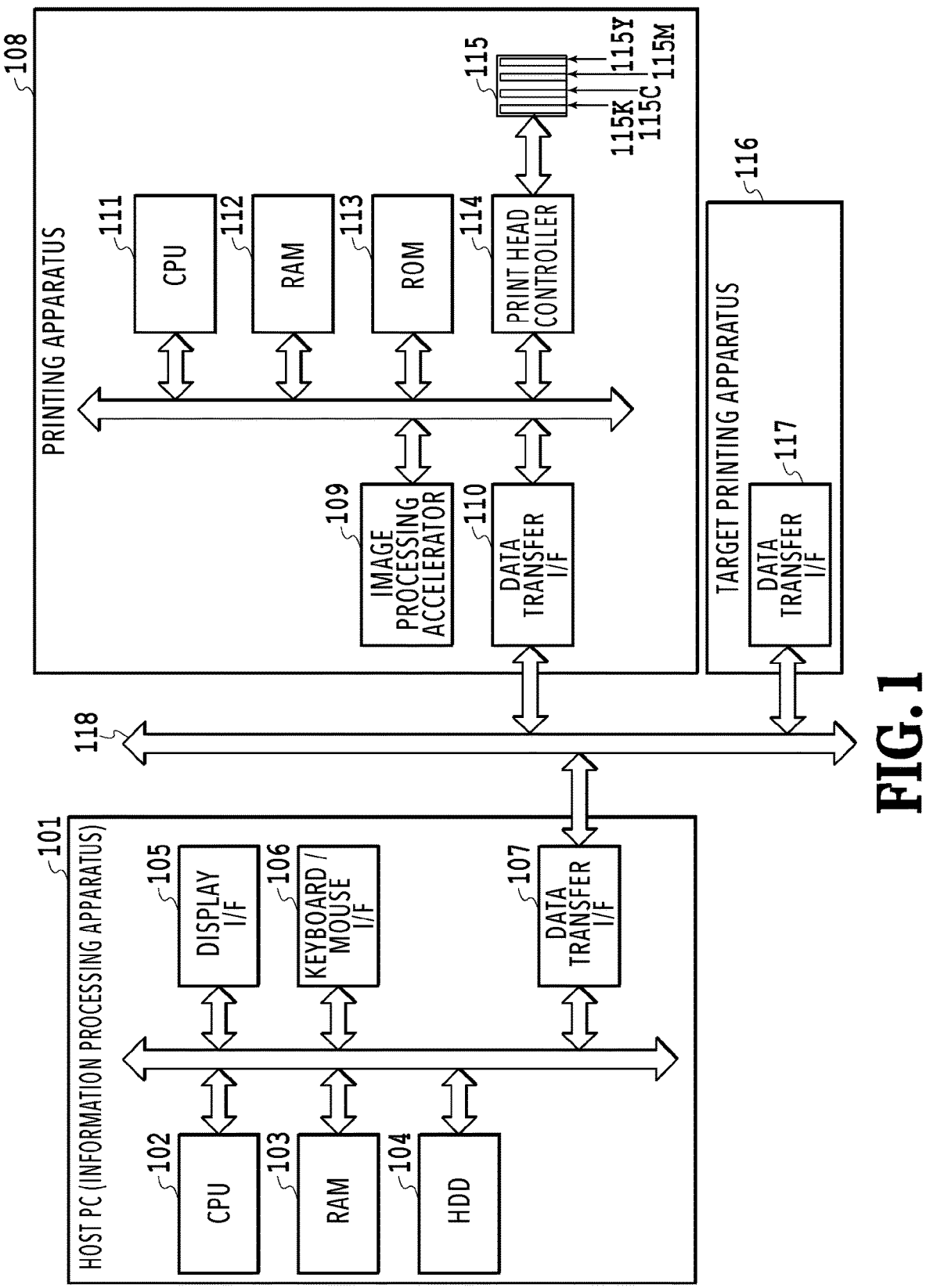
FIG. 1 is a block diagram showing a configuration of a printing system in a first embodiment.

FIG. 1 is a block diagram explaining a configuration of a printing system in the present embodiment. As shown in FIG. 1, the printing system has a host PC (also called an information processing apparatus, an image processing apparatus, and the like) 101, a first printing apparatus 108, and a second printing apparatus 116. The second printing apparatus 116 is a printing apparatus that is a target of matching of lines width and colors, and, therefore, referred to as the target printing apparatus 116 hereafter.

The information processing apparatus 101 is specifically a host PC, a tablet PC, and the like. In the information processing apparatus 101, a CPU 102 performs various kinds of processing in accordance with programs stored in an HDD 104 by using a RAM 103 as a work area. For example, the CPU 102 receives a command corresponding to instructions that are input by a user via a keyboard/mouse interface 106 (hereafter, interface is abbreviated to I/F). Then, the CPU 102 generates image data that the printing apparatus 108 can print in accordance with the received command and the programs stored in the HDD 104 and transmits the generated image data to the printing apparatus 108.

Further, the information processing apparatus 101 (CPU 102) performs predetermined processing in accordance with the programs stored in the HDD 104 for the image data received from the printing apparatus 108 via a data transfer I/F 107. The CPU 102 displays a variety of pieces of information, such as the processing results, on a display, not shown schematically, via a display I/F 105. It is possible for the information processing apparatus 101 (CPU 102) to perform the same processing as that for the printing apparatus 108, described previously, also for the target printing apparatus 116.

On the other hand, in the printing apparatus 108, a CPU 111 performs various kinds of processing in accordance with programs stored in a ROM 113 by using a RAM 112 as a work area. Further, the printing apparatus 108 includes an image processing accelerator 109 for performing high-speed image processing. The image processing accelerator 109 is hardware capable of performing image processing at a speed higher than that of the CPU 111. The image processing accelerator 109 is activated by the CPU 111 writing parameters and data necessary for image processing to a predetermined address of the RAM 112. After reading the parameters and data written to the RAM 112, the image processing accelerator 109 performs predetermined image processing for the data. The image processing accelerator 109 is not an indispensable component and it is possible for the CPU 111 to perform equivalent processing without the printing apparatus 108 including the image processing accelerator 109.

The printing apparatus 108 referred to here is a printing apparatus that uses pigment inks of four colors, specifically, pigment inks of cyan, magenta, yellow, and black (CMYK) and the ejection amount of each nozzle in a print head 115 is set to 4 [pl]. In contrast to this, the target printing apparatus 116 is a printing apparatus that uses kinds of pigment ink different from those of pigment ink used by the printing apparatus 108, although the target printing apparatus 116 uses the four colors of CMYK and the ejection amount of each nozzle in the print head is set to 6 [pl]. The composition of the pigment inks used in the printing apparatus 108 and the composition of the pigment inks used in the target printing apparatus 116 are different, and, therefore, even in a case when printing is performed based on identical image data, the color of the output material of the printing apparatus 108 differs from the color of the output material of the target printing apparatus 116. Further, the ejection amount of each nozzle of the target printing apparatus 116 is larger than that of the printing apparatus 108, and, therefore, the minimum line width that can be drawn by the target printing apparatus 116 is greater than that by the printing apparatus 108. Consequently, in the present embodiment, in the printing apparatus 108, the processing to match line widths between the printing apparatus 108 and the target printing apparatus 116 and the processing to match colors between the printing apparatus 108 and the target printing apparatus 116 are performed. Due to this, the output printed by the printing apparatus 108 based on image data is put close to the output in a case when printing is performed by the target printing apparatus 116 based on this image data.

The information processing apparatus 101 is connected with the printing apparatus 108 and the target printing apparatus 116 via a communication line 118. However, the printing apparatus 108 and the target printing apparatus 116 do not need to be connected simultaneously with the information processing apparatus 101 at all times, and may be disconnected as needed. In this example, an explanation is given on the assumption that the target printing apparatus 116 is an ink jet printer, but the target printing apparatus may be a printing apparatus, such as an electrophotographic printer, a copy machine, and an LED plotter. Further, in this example, an explanation is given on the assumption that the communication line 118 is an Ethernet (registered trademark), but the communication circuit may be a USB hub, a wireless communication network using a wireless access point, and a connection using the WiFi Direct communication function.

<About Flow of Image Data Conversion Processing>

Figure 2:
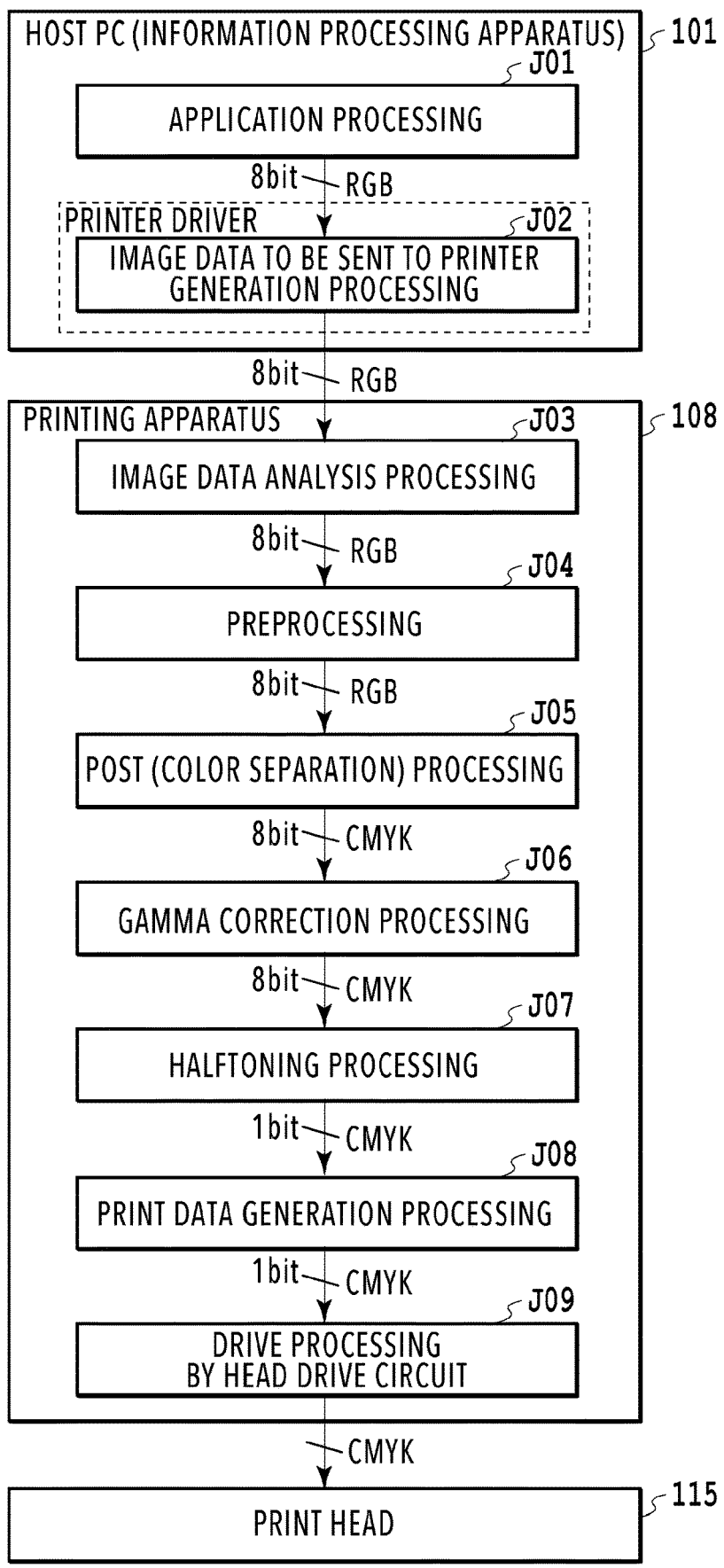
FIG. 2 is a diagram showing a flow of image data conversion processing in the first embodiment.

FIG. 2 is a diagram showing a flow of image data conversion processing in the present embodiment. In the following, processing in the printing apparatus 108 is described, but it is also possible for the target printing apparatus 116 to take the same configuration.

The printing apparatus 108 prints an image on a printing medium by using four color inks of cyan, magenta, yellow, and black. In the present specification, each ink color is represented by one character, specifically, cyan is represented as C, magenta as M, yellow as Y, and black as K. The print head 115 has nozzle columns 115C, 115M, 115Y, and 115K ejecting these four color inks. It is assumed that each piece of image processing in the printing system is performed by one of the information processing apparatus 101 and the printing apparatus 108, each functioning as an image processing apparatus as shown in FIG. 2.

As a program that runs on the operating system (OS) of the information processing apparatus 101, there is an application or a printer driver. As the application, there is, for example, an application for creating a CAD drawing. In application processing J01, processing to generate image data corresponding to an image to be subjected to image printing (to be printed) by the printing apparatus 108 is performed by the application. The image data generated in the application processing J01 is delivered to the printer driver.

The printer driver installed in the information processing apparatus 101 generates image data in the PDL (Page-Description Language) format as image data. In the present specification, image data in the PDL format is described simply as PDL data. PDL is an abbreviation of Page Description Language. As an example of PDL, "PDF" and "PostScript" of Adobe Systems, "HPGL/2" of Hewlett-Packard Enterprise, and the like, are known. PDL is widely used as the image format capable of describing vector data of lines, characters, and the like, not only bitmaps.

The printer driver performs image data to be sent to printer generation processing J02 to generate image data to be sent to printer, which is PDL data, based on the image data delivered from the application. The printer driver generates image data to be sent to printer by adding a header portion including setting information, and the like, relating to printing, which is set by a user via a user interface (UI) of the information processing apparatus 101, to the image data delivered from the application. The generated image data to be sent to printer is sent to the printing apparatus 108 via the data transfer I/F 107 of the information processing apparatus 101 and stored in the RAM 112 via the data transfer I/F 110 of the printing apparatus 108.

Figure 3A:
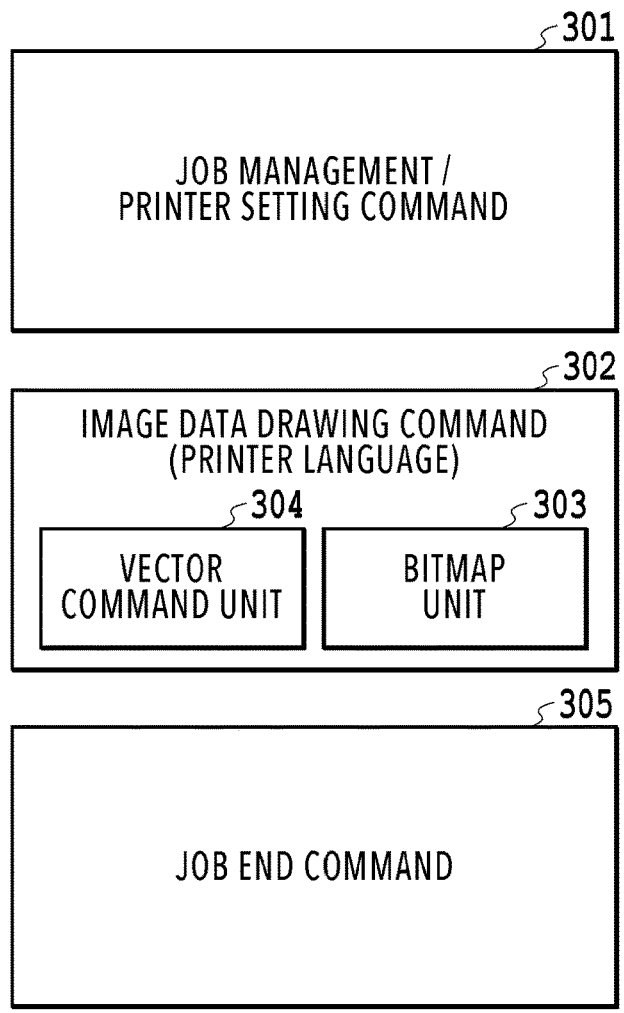
FIG. 3A and FIG. 3B are diagrams explaining a page description language (PDL) format.
Figure 3B:
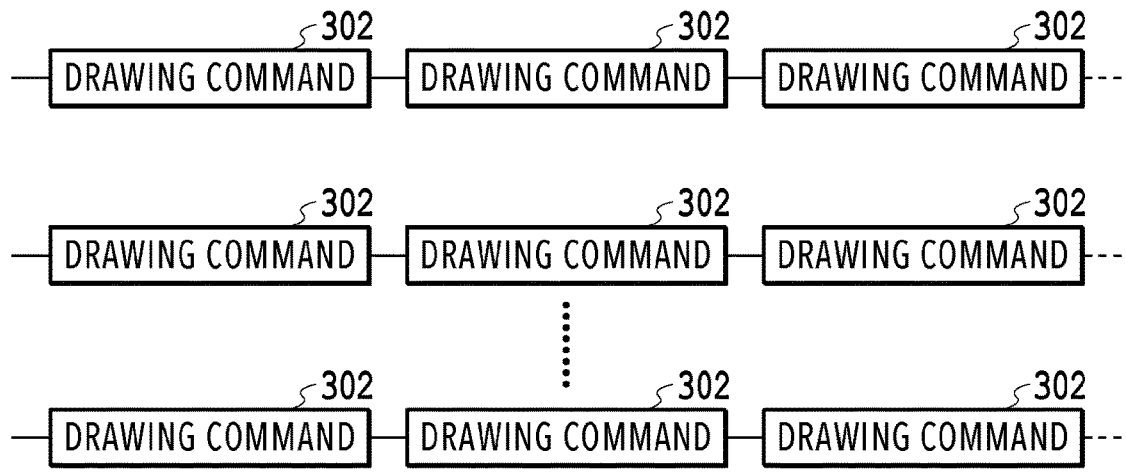

Here, conversion (rasterization) from PDL format image data into raster image data is explained by using FIG. 3A, FIG. 3B, and FIG. 4.

FIG. 3A is a diagram showing an example of the PDL format. The PDL format includes a job management/printer setting command 301, an image data drawing command 302, and a job end command 305. The image data drawing command 302 includes a vector command unit 304, in addition to a bitmap unit 303, and has the format capable of representing figures, such as characters and lines, not only bitmaps. FIG. 3B is a diagram explaining the image data drawing command 302. The image data drawing command 302 has a configuration in which a plurality of series of the drawing commands 302 for each certain unit (here, 64 [KB]), which is called a display list (DL), is bundled.

FIG. 4 is a command list table explaining details of the drawing command 302. By referring to FIG. 4, it is known that the drawing command 302 is roughly divided into a bitmap drawing command and a vector drawing command. Further, the vector drawing command is roughly divided into a line drawing command relating to the color of a pen, the line width, drawing, and the like, a character drawing command specifying the character font and the character itself, and a hatching drawing command specifying the kind and density of hatching. Image data (PDL data) in the PDL format as shown in FIG. 3A, FIG. 3B, and FIG. 4 is sent from the information processing apparatus 101 to the printing apparatus 108.

The CPU 111 of the printing apparatus 108 functions as an image processing unit and performs image data analysis processing J03. In the image data analysis processing J03, PDL data is read sequentially from the RAM 112 functioning as a data buffer. Then, the CPU 111 interprets the drawing command included in the PDL data, rasterizes the image data in the PDL format into raster image data in the same format as that of a bitmap, and stores the rasterized raster image data in the RAM 112. For the analyzed and rasterized raster image data, the image processing by the CPU 111 is performed continuously. Although details will be described later (see FIG. 12), in the present embodiment, in the image data analysis processing J03, line width adjustment for absorbing the difference in the line width between the target printing apparatus 116 and the printing apparatus 108 is performed.

The explanation returns to the image data conversion processing. In the CPU 111 that functions as the image processing unit, preprocessing J04 to perform color matching between models, post processing J05, gamma correction processing 106, halftoning processing J07, which is quantization (specifically, binarization), and print data generation processing J08 are performed. In the following, each piece of processing is explained.

In the preprocessing J04, as the processing to absorb the difference in color between the target printing apparatus 116 and the printing apparatus 108, mapping for matching colors between models is performed. For example, in a case when the image data that is output as the results of the image data analysis processing J03 is the image data of the sRGB standard, data conversion is performed for the image data, which maps the gamut reproduced by the target printing apparatus 116 to within the gamut that can be reproduced by the printing apparatus 108. Specifically, by referring to a three-dimensional lookup table (3D LUT), the data in which each of R, G, and B is represented by eight bits is converted into the data in which each of R, G, and B is represented by eight bits, depending on the printing apparatus 108. Details of the color matching processing will be described later.

In the post processing J05, processing to convert the 3-channel (R, G, B) data represented by eight bits obtained by the preprocessing J04 into data (here, 4-channel (C, M, Y, K) data represented by eight bits) corresponding to combinations of ink colors that reproduce the colors represented by the RGB data is performed. This conversion processing is called color separation processing. In the post (color separation) processing J05, a conversion table (for example, 3D LUT) in which the RGB data and the CMYK data are associated with each other in a one-to-one manner is used. The CPU 111 converts the RGB data into the CMYK data by referring to the conversion table.

For example, the values of R, G, and B, each being represented by eight bits (0 to 255), and the values of C, M, Y, and K, each being represented by eight bits (0 to 255), are associated with each other in advance in the three-dimensional LUT. Then, conversion from (R, G, B)=(0 to 255, 0 to 255, 0 to 255) into (C, M, Y, K)=(0 to 255, 0 to 255, 0 to 255, 0 to 255) is performed. For example, in a case when (R, G, B)=(0, 0, 0), this is converted into (C, M, Y, K)=(0, 0, 0, 255). Further, in a case when (R, G, B)=(255, 255, 255), this is converted into (C, M, Y, K)=(0, 0, 0, 0). Furthermore, in a case when (R, G, B)=(0, 128, 0), this is converted into (C, M, Y, K)=(128, 0, 128, 0).

In the gamma correction processing J06, tone value conversion is performed for each piece of ink color data configuring the color separation data (CMYK data) obtained by the post processing J05. Specifically, by using a one-dimensional LUT in accordance with the tone characteristic of each color ink of the printing apparatus 108, conversion by which the color separation data is associated linearly with the tone characteristic of the printing apparatus 108 is performed.

In the halftoning processing J07, quantization processing for each piece of ink color data configuring the color separation data, specifically, quantization processing to convert the 8-bit data of each ink color of C, M, Y, and K into 1-bit data is performed. In the present embodiment, processing to convert the 8-bit data of 256 tones into 1-bit data of two tones is performed by using the binary dither method.

In the print data generation processing J08, print data is generated, which is the print image data having 1-bit (binary) dot data as contents to which printing control information is added. The generated print data is stored in the RAM 112. The binary data stored in the RAM 112 is read sequentially by the CPU 111, input to the head drive circuit, and drive processing J09 is performed. In the drive processing J09, 1-bit data of each ink color, which is input to the head drive circuit, is converted into a drive pulse of the print head 115 and ink is ejected at predetermined timing.

<About Preparation Processing for Matching Color and Line Width>

Figure 5:
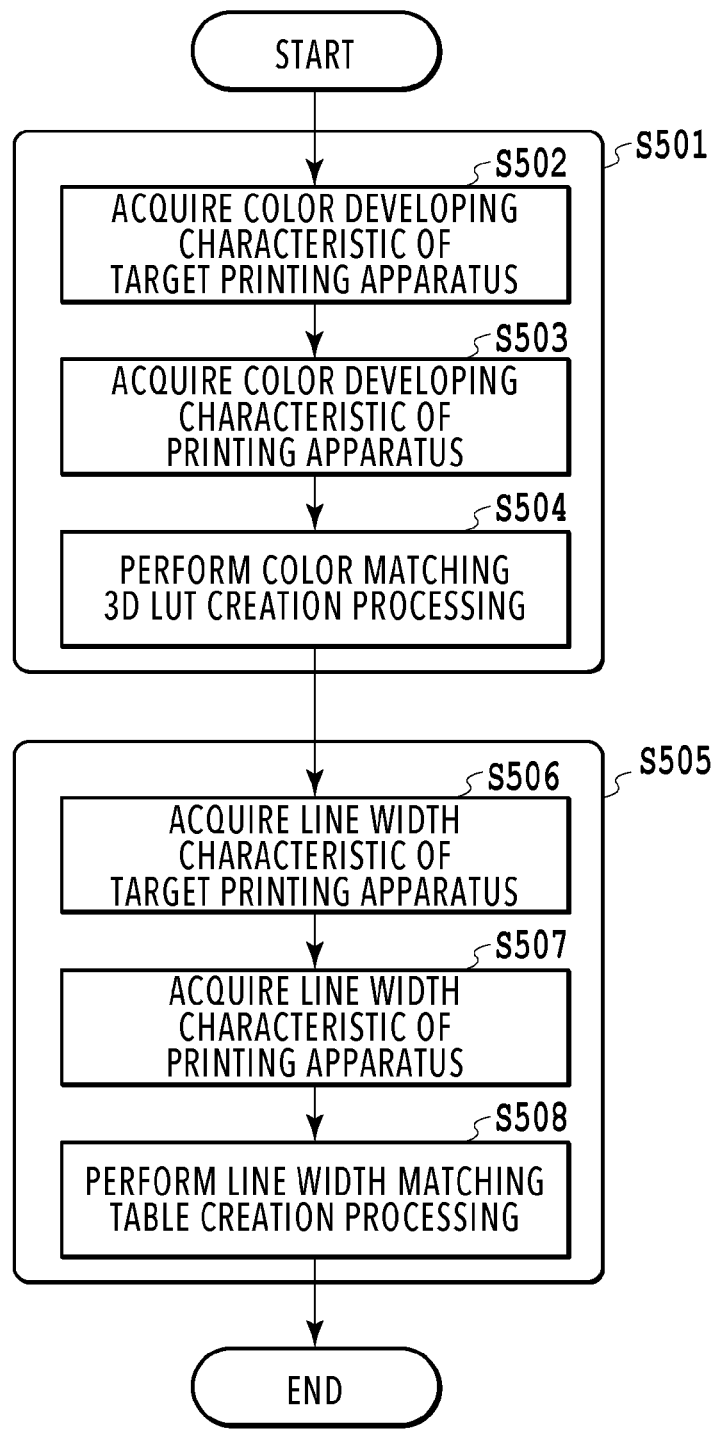
FIG. 5 is a flowchart of preparation processing for matching colors and line widths in the first embodiment.

In the present embodiment, line widths are matched separately from color matching. Due to this, an attempt is made to match the line width printed by the printing apparatus with the line width printed by the target printing apparatus while matching the apparent colors. In the following, preparation processing for matching colors and line widths in printed matter printed by each of a plurality of printing apparatuses based on identical image data in the present embodiment is explained by using FIG. 5. In the preparation processing, as shown in FIG. 5, step S501 (color matching method determination processing) and step S505 (line width matching method determination processing) are included. In the following, "step S-" is simply described as "S-".

<<About Preparation Processing for Matching Color (Color Matching Method Determination Processing)>>

First, color matching method determination processing at step S501 is explained. In the color matching method determination processing at step S501, first, at step S502, the color developing characteristic of the target printing apparatus 116 is acquired. At step S503, the color developing characteristic of the printing apparatus 108 is acquired. At step S502 and step S503, it is possible to use a solid-painted patch (called solid patch). Specifically, the solid patch is a solid-painted patch in which each value (taking one value in a range between 0 and 255) of (R, G, B) is changed in units of 32 values. In this case, image data representing 729 (=9×9×9) solid patches is generated and based on the generated image data, printing is performed by the printing apparatus 108 and the target printing apparatus 116, respectively, and measurement is performed by a colorimeter as a measurement unit. Due to this, it is possible to acquire the color developing characteristic of each of the printing apparatus 108 and the target printing apparatus 116. The processing order of S502 and S503 may be opposite.

Step S504 is color matching 3D LUT generation processing. In this processing, a color matching table used at the time of performing color matching between the target printing apparatus 116 and the printing apparatus 108 is generated. It may be possible to store the color matching table generated at this step in the HDD 104 or a ROM (not shown schematically) of the information processing apparatus 101, in the ROM 113 of the printing apparatus 108, and the like. The color matching table generated at this step is used in the preprocessing J04 described previously. Here, based on the color developing characteristic obtained for each of the target printing apparatus 116 and the printing apparatus 108, the color matching table (color matching 3D LUT) is generated by using a publicly known color matching technique. By applying the color matching table, it is possible to put the output color of the printing apparatus 108 close to the output color of the target printing apparatus 116.

As described above, in the present embodiment, the color matching table is generated by using the solid patch and color matching is performed by applying the generated color matching table to the solid-painted portion. It may also be possible to perform color matching by applying the color matching table to a line as in the case with the solid-painted portion. In the following, the color matching of a line is explained.

Combinations of basic lines used widely in a CAD drawing are explained by using FIG. 6A and FIG. 6B. FIG. 6A is a table storing data relating to the basic lines used widely in a CAD drawing. As shown in FIG. 6A, as the basic lines, the thin line, the thick line, and the very thick line whose line width ratio is 1:2:4 are used. For example, in a case when the thin line is 0.50 [mm] wide, the thick line is represented by 1.00 [mm] and the very thick line is represented by 2.00 [mm]. In the other rows of the table in FIG. 6A, data relating to the basic lines having another thickness, which are used frequently, is described.

FIG. 6B shows how the line is represented in a case when the line shown in FIG. 6A is represented by a printer with 1,200 [dpi]. For example, in a case when the thin line is 0.5 [mm] wide, the line is represented by 24 [pixel], in a case when the thick line is 1.00 [mm] wide, by 48 [pixel], and in a case when the very thick line is 2.00 [mm] wide, by 96 [pixel]. As described above, even the thin line has a width of a plurality of pixels in fact and even by a printer that performs area modulation, it is made possible to reproduce a halftone. However, in a case when color matching of a line is performed by applying the color matching table described previously, anew problem arises in reproduction of a line.

<<About Problem in Line Reproduction Resulting from Color Matching>>

In the following, a problem in line reproduction resulting from color matching described previously is explained by using FIG. 7.

Figure 7:
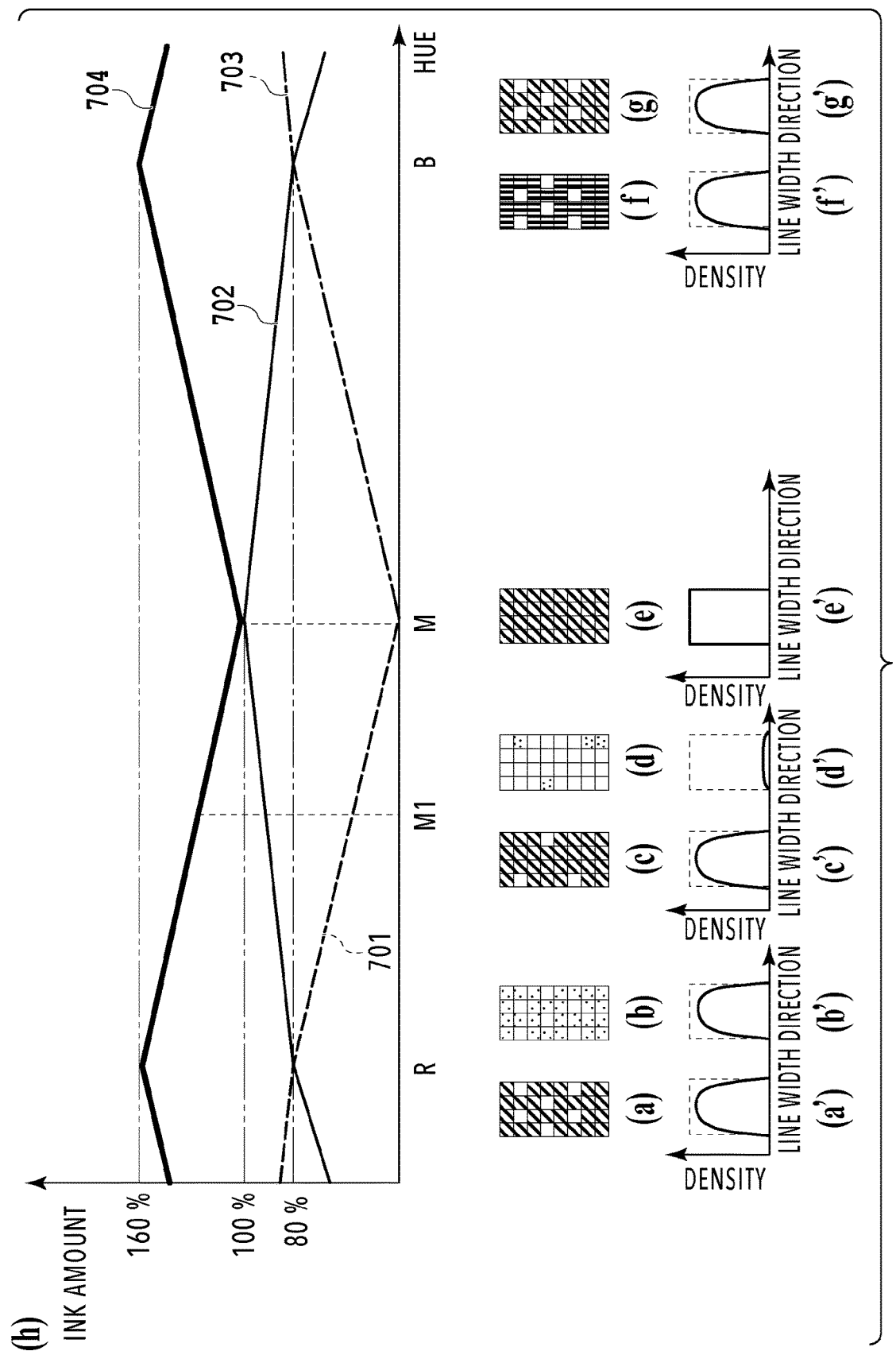
FIG. 7 is a diagram for explaining a problem in line reproduction resulting from color matching.

A reference character (h) in FIG. 7 indicates a diagram showing color separation applied in the post (color separation) processing J05 of the printing apparatus 108 along a line of red (R)→magenta (M)→blue (B) in the color space reproduced by the printing apparatus 108. The horizontal axis in (h) represents the hue and here, represents the area between the vicinity of the red point and the vicinity of the blue point in the color space reproduced by the printing apparatus 108. The vertical axis in (h) represents the ink application amount. Further, in (h), a broken line 701 indicates the yellow ink application amount, a solid line 702 indicates the magenta ink application amount, a one-dot chain line 703 indicates the cyan ink application amount, and a thick solid line 704 indicates the total application amount of each color ink.

A reference character (a) in FIG. 7 shows a paper surface covered state of the magenta ink at an R point and a reference character (b) in FIG. 7 shows the paper surface covered state of the yellow ink at the R point. A reference character (a') in FIG. 7 shows the print density of the magenta ink corresponding to the paper surface covered state shown in (a) and a reference character (b') in FIG. 7 shows the print density of the yellow ink corresponding to the paper surface covered state shown in (b).

Similarly, a reference character (c) in FIG. 7 shows the paper surface covered state of the magenta ink at an M1 point and a reference character (d) in FIG. 7 shows the paper surface covered state of the yellow ink at the M1 point. A reference character (c') in FIG. 7 shows the print density of the magenta ink corresponding to the paper surface covered state shown in (c) and A reference character (d') in FIG. 7 shows the print density of the yellow ink corresponding to the paper surface covered state shown in (d).

Similarly, a reference character (e) in FIG. 7 shows the paper surface covered state of the magenta ink at an M point and a reference character (e') in FIG. 7 shows the print density of the magenta ink corresponding to the paper surface covered state shown in (e).

Similarly, a reference character (f) in FIG. 7 shows the paper surface covered state of the cyan ink at a B point and a reference character (g) in FIG. 7 shows the paper surface covered state of the magenta ink at the B point. A reference character (f') in FIG. 7 shows the print density of the cyan ink corresponding to the paper surface covered state shown in (f) and a reference character (g') in FIG. 7 shows the print density of the magenta ink corresponding to the paper surface covered state shown in (g).

As shown in (f) in FIG. 7, at the M point, the magenta ink is used in an ink amount of 100% and the paper surface state at this time is such that the paper surface is covered by the 100% magenta ink as shown in (e) in FIG. 7.

There is an upper limit to the ink amount that can be received per unit area of a printing medium, such as a sheet.

and this is called an allowable application amount, an allowable applying amount, and the like. It is rare for the application amount of the primary color ink, such as the magenta, yellow, and cyan inks, to exceed the upper limit thereof, but there is a case when the application amount of the secondary color ink, such as the red, blue, and green inks, exceeds the upper limit thereof. Because of this, in (f) in FIG. 7, at the R point, the application amount is not 100% for both the magenta ink and the yellow ink but 80% so that the total of the application amounts of these inks is less than or equal to an upper limit value of 160%. A reference character (a) in FIG. 7 shows the paper surface covered state of the magenta ink at this time and a reference character (b) in FIG. 7 shows the covered state of the yellow ink at this time. As shown in (a) and (b) in FIG. 7, a dot defect occurs because the application amount is not 100%. Due to the dot defect, the waveform of the print density of the magenta ink is not a rectangular shape as shown in (e') in FIG. 7 but a gradually curved shape as shown in (a') in FIG. 7, and, therefore, the line width is reduced compared to that in a case when the waveform of the print density is a rectangular shape. Consequently, in the present embodiment, line width matching is performed by also taking into consideration the deviation in line width that occurs as a result of the color matching such as this.

Here, the dot defect that occurs resulting from color matching and area coverage modulation processing is explained, but a case is also considered where blurring occurs in the area in which the application amount is great, and, therefore, the line thickens and even in the case such as this, the method of the present embodiment is effective.

<<About Preparation Processing for Matching Line Width (Line Width Matching Method Determination Processing)>>

Figure 8:
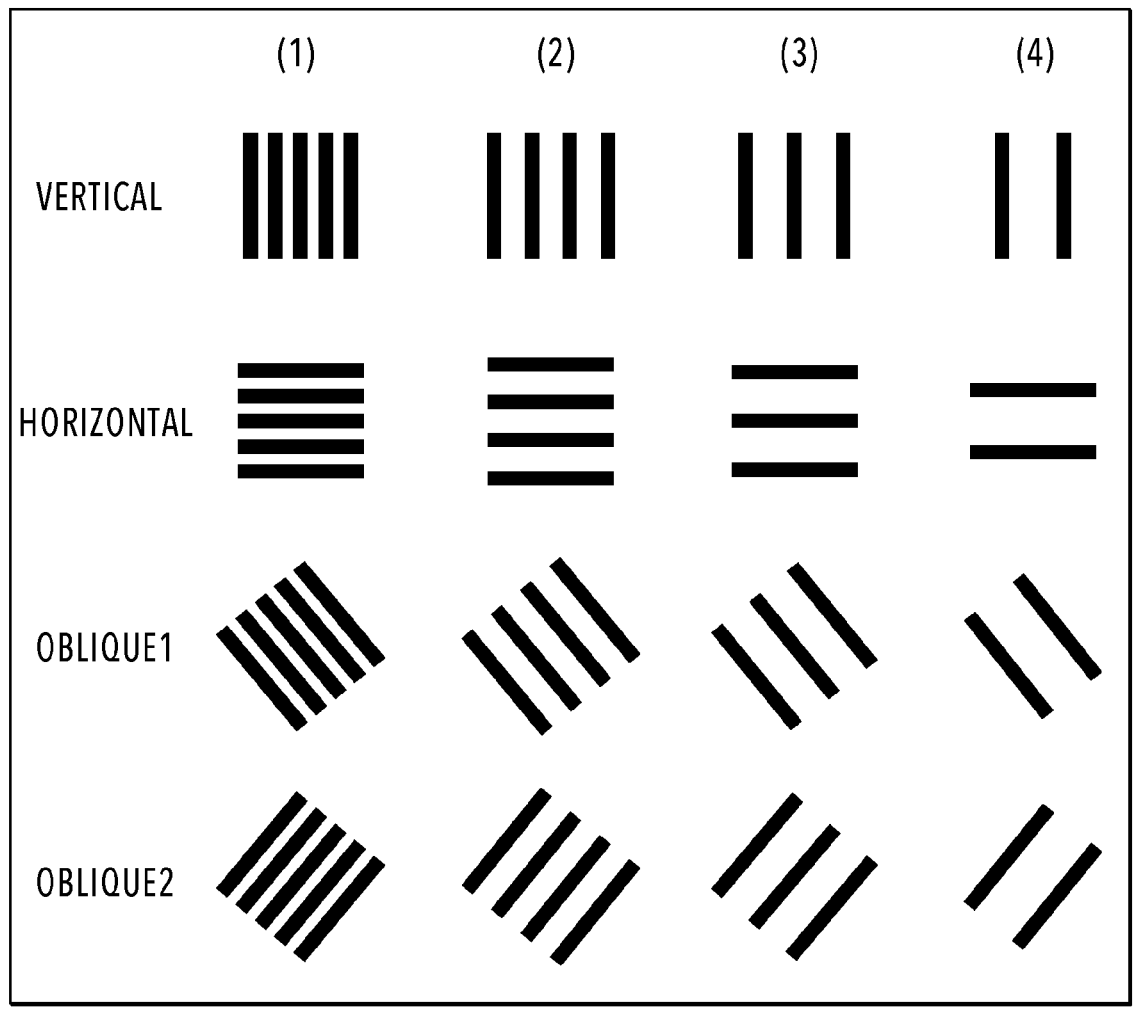
FIG. 8 is a line width determination chart.

Following the above, the line width matching method determination processing (FIG. 5) at step S505 is explained. As shown in FIG. 5, the line width matching method determination processing at step S505 includes acquisition of the line width characteristic of the target printing apparatus 116 at step S506 and acquisition of the line width characteristic of the printing apparatus 108 at step S507. In order to acquire the line width characteristic at step S506 and step S507, in the present embodiment, a line width determination chart as illustrated in FIG. 8 is used. At step S506, the target printing apparatus 116 is caused to print the line width determination chart. Then, after performing color matching (preprocessing J04) by using the color matching table (color matching 3D LUT) generated at step S504 in the printing apparatus 108, at step S507, the printing apparatus 108 is caused to print the line width determination chart.

The line width determination chart shown in FIG. 8 has a "vertical" row in which a plurality of (in this example, four) images including vertical lines is arrayed and a "horizontal" row in which a plurality of images including horizontal lines is arrayed. The line width determination chart further has an "oblique 1" row in which a plurality of images including lines extending from bottom right toward top left is arrayed and an "oblique 2" row in which a plurality of images including lines extending from bottom left to top right is arrayed. Each image within the line width determination chart includes lines having a width of one pixel in units of 1,200 [dpi] and blanks between adjacent lines.

Further, the line width determination chart shown in FIG. 8 has a column of (1), a column of (2), a column of (3), and a column of (4). In the image in the column of (1), the width (interval) of the blank between adjacent one-pixel lines corresponds to one pixel. Similarly, in the image in the column of (2), the width of the blank between adjacent one-pixel lines corresponds to two pixels, in the image in the column of (3), the width of the blank corresponds to three pixels, and in the image in the column of (4), the width of the blank corresponds to four pixels. In a case when the dot diameter is large or blurring occurs at the time of printing, the blank is filled and adjacent lines adhere to each other.

For example, a case is considered when the blank is filled in the image of (1) and the image of (2) in the "vertical" row and on the other hand, in the image of (3) and in the image of (4), the blank is not filled (gap is seen). In a case when it is assumed that the one-pixel line thickens equally both to the left side and to the right side, the blank corresponding to two pixels is filled, and, therefore, it is known that the line having thickened has a width of 25.4 [mm]/1,200 [dpi]× 2=0.042 [mm] or more. On the other hand, the blank corresponding to three pixels is not filled, and, therefore, it is known that the line having thickened has a width less than 25.4 [mm]/1,200 [dpi]×3=0.064 [mm]. Consequently, here, the average of these values, that is, (0.042+0.064)/2=0.053 [mm] is regarded as the line width of the line having thickened.

Figure 9:
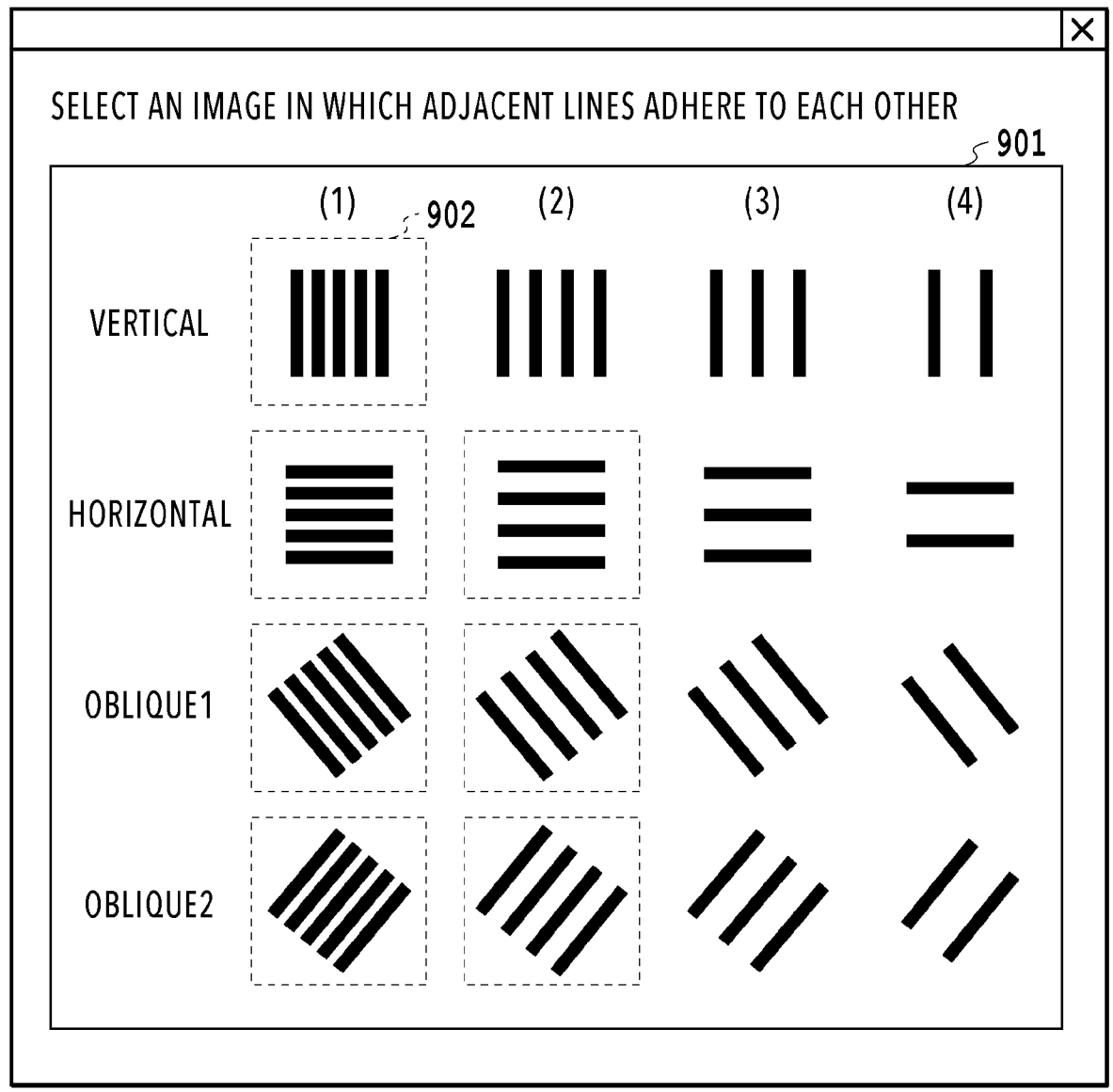
FIG. 9 is a UI causing a user to input determination results using a line width determination chart.

FIG. 9 shows a UI example that is displayed on a display for causing a user to select an image in which adjacent lines adhere to each other. In this example, a user is caused to select all the images in which adjacent lines adhere to each other (in other words, the blank is filled) at the time of printing in each of "vertical", "horizontal", "oblique 1", and "oblique 2" rows within an area 901. The image enclosed by a broken line 902 indicates the image selected by a user. In a case when the pixel width of the image whose pixel width of the blank is the largest of the images in which adjacent lines adhere to each other at the time of printing in each row (the rightmost image of the images in which adjacent lines adhere to each other) is taken to be N [pixel], it is possible to calculate the line width (referred to as W) by equation (1) below.

[Mathematical equation 1]

$$W = 25.4/1,200 \times (N+0.5) \qquad \text{equation (1)}$$

In order to estimate the line width on printed matter, it is necessary to acquire information indicating the image in which the interval between lines is the largest of the images in which two adjacent lines adhere to each other. In the above-described embodiment, by causing a user to select all the images in which two adjacent lines adhere to each other and the gap cannot be recognized visually, the line width on the printed matter is calculated based on the information. However, it may also be possible to cause a user to select the image whose interval between lines is the largest from among the images in which the gap cannot be recognized visually or cause a user to select the image whose interval between lines is the smallest from among the images in which the gap can be recognized visually. In a case when all the images included in the chart have the gap between two adjacent lines on the image data, by acquiring information indicating the image in which one or more gaps cannot be recognized visually, it is known that the output line width has become greater than the input line width, and, therefore, it is possible to perform correction to reduce the line width.

By printing a plurality of kinds of line width determination chart in which the line widths in the images that are arrayed are different from one another, the line width characteristic is acquired for each of the target printing apparatus 116 and the printing apparatus 108.

Here, the line width characteristic is acquired by using the line width determination chart, but it may also be possible to appropriately adopt a method for acquiring the line width characteristic, such as a method of directly measuring the line width with the handy image evaluation system PIAS™-II of QEA, Inc.

After step S507, at step S508, the line width matching table is generated. In the following, line width matching table generation processing at step S508 is explained with reference to the drawings. The CPU 111 of the printing apparatus 108 functions as an image processing unit and performs adjustment of the line width accompanying raster image rasterization for absorbing the difference in line width between the target printing apparatus 116 and the printing apparatus 108 in the image data analysis processing J03. Specifically, the CPU 111 performs adjustment to increase the line width, reduce the line width, and so on by referring to the line width matching table generated at step S508 and changing the numerical value of the line width specifying value [mm] in the PDL format.

In the present embodiment, as a parameter for adjusting the line width, "input line width after correction" is found. The input line width after correction is explained by using FIG. 10. FIG. 10 shows an example of the table that is generated at step S508. This table stores each value of the input line width (before correction) in the PDL format, the output line width of each of the printing apparatus 108 and the target printing apparatus 116, which corresponds thereto, and the input line width after correction that should be set to the printing apparatus 108 finally. In the PDL format, the input line width [mm] is specified. However, in a case when the line having this input line width is printed actually by the printing apparatus 108, a line having a printing apparatus output line width [mm] is obtained and similarly, in a case when the line having this input line width is printed by the target printing apparatus 116, a line having a target printing apparatus output line width [mm] is obtained. The line width that should be set to the printing apparatus 108 by taking this into consideration in order to obtain the output line width in a case when printing is performed by the target printing apparatus 116 based on certain print data on a condition that printing is performed by the printing apparatus 108 based on the certain print data is the input line width after correction [mm].

Figure 11:
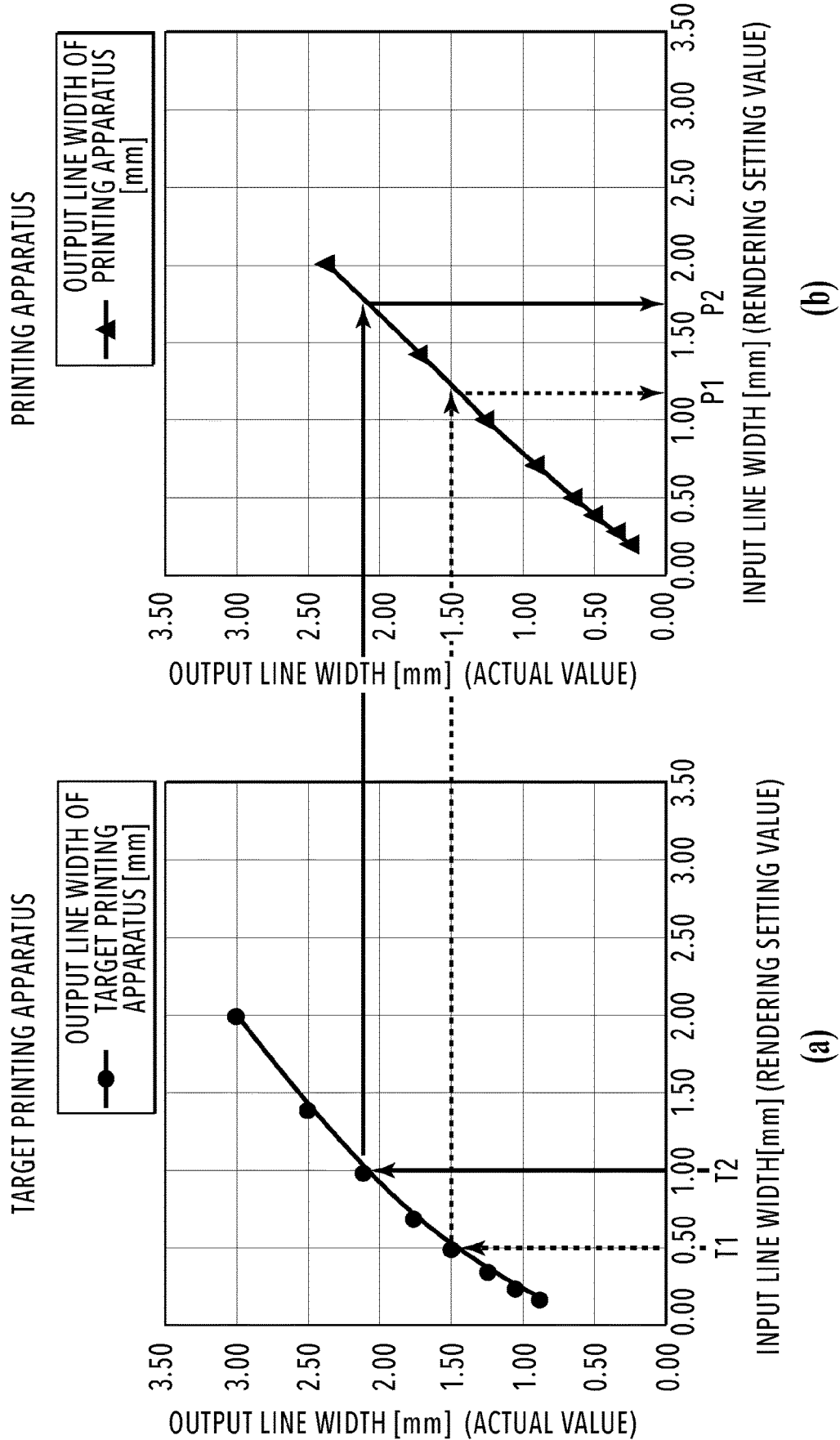
FIG. 11 is a diagram for explaining how to find an input line width after correction.

In the following, a method of finding the input line width after correction is explained by using FIG. 11. A reference character (a) in FIG. 11 is a graph representing a relationship between the input width [mm] that is set in the PDL format and the output line width actual value [mm] that is obtained for this input by the target printing apparatus 116. As described previously, at S506, the line width determination chart shown in FIG. 8 is printed and at this time, by plotting the results obtained by printing a plurality of times similar line width determination charts in which the thickness of the line in each image is different from one another, it is possible to obtain the relationship as shown in (a).

Further, a reference character (b) in FIG. 11 indicates a graph representing a relationship between the input line width [mm] that is set in the PDL format and the output line width actual value [mm] that is obtained for this input by the printing apparatus 108. As described previously, at S507, the line width determination chart shown in FIG. 8 is printed and at this time, by plotting the results obtained by printing a plurality of times similar line width determination charts in which the thickness of the line in each image is different from one another, it is possible to obtain the relationship as shown in (b).

Here, as an example, it is assumed that an input line width T1 (=0.50 [mm]) is set in the target printing apparatus 116. At this time, the output line width is 1.50 [mm] as shown in (a). In order to find the input line width in the printing apparatus 108, which implements the output line width of 1.50 [mm], a broken-line arrow is followed and (b) is referenced. Then, it is known that P1 (=1.19 [mm]) should be set to the printing apparatus 108 as the input line width after correction.

As another example, it is assumed that an input line width T2 (=1.00 [mm]) is set in the target printing apparatus 116. The output line width at this time is 2.12 [mm] as shown in (a). In order to find the input line width in the printing apparatus 108, which implements the output line width of 2.12 [mm], a solid-line arrow is followed and (b) is referenced. Then, it is known that P2 (=1.74 [mm]) should be set to the printing apparatus 108 as the input line width after correction.

The values thus found are stored in the table in FIG. 10 and the table is stored in the HDD 104 of the information processing apparatus 101 or the ROM 113 of the printing apparatus 108.

In the above, "input line width after correction" is found by referring to the table in FIG. 10. As another method, there is a method in which the difference between "input line width after correction" and "input line width" is found in advance and the difference value is used. It may also be possible to obtain "input line width after correction" by adding the difference value as the offset for "input line width".

<Color Matching and Line Width Matching Actually Applying Color Matching Method and Line Width Matching Method>

Figure 12:
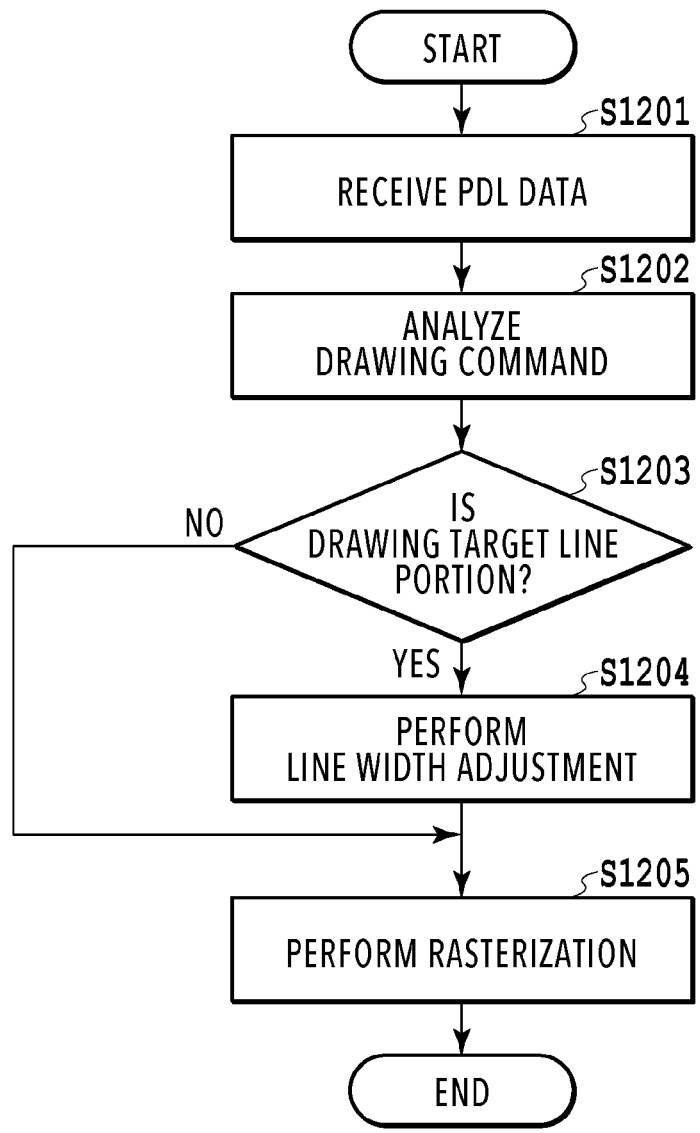
FIG. 12 is a flowchart of processing to match line widths and colors in the first embodiment.

Processing to perform color matching and line width matching by actually applying the color matching method and the line width matching method, which are found in the preparation processing explained so far, is explained by using FIG. 12. In the present embodiment, line width matching processing is performed in the image data analysis processing J03 and color matching processing is performed in the preprocessing J04.

At step S1201, the printing apparatus 108 receives PDL data.

At step S1202, the CPU 111 or the image processing accelerator 109 analyzes a drawing command in the received PDL data.

At step S1203, the CPU 111 or the image processing accelerator 109 determines whether the drawing target is a line portion. In a case when determination results at step S1203 are affirmative, the processing advances to step S1204 and on the other hand, the determination results are negative, the processing advances to step S1205.

At step S1204, the CPU 111 or the image processing accelerator 109 performs line width adjustment. In detail, the CPU 111 or the image processing accelerator 109 refers to the table as shown in FIG. 10 and changes the line width specifying value in the drawing command of the line portion from the current input line width to the value of the input line width after correction corresponding thereto. At this step, it may also be possible to use a publicly known interpolation method.

At step S1205, the CPU 111 or the image processing accelerator 109 performs rasterization processing for the line for which line width adjustment has already been performed or the object that is not a line. Due to this, the drawing target-object is rasterized into raster image data similar to a bitmap.

For the rasterized raster image data, color matching processing is performed in the preprocessing J04. Specifically, color matching is performed that applies a color matching table that absorbs the difference in color between the target printing apparatus 116 and the printing apparatus 108 together with a publicly known interpolation method, such as tetrahedral interpolation.

About Effect of the Present Embodiment

Figure 13:
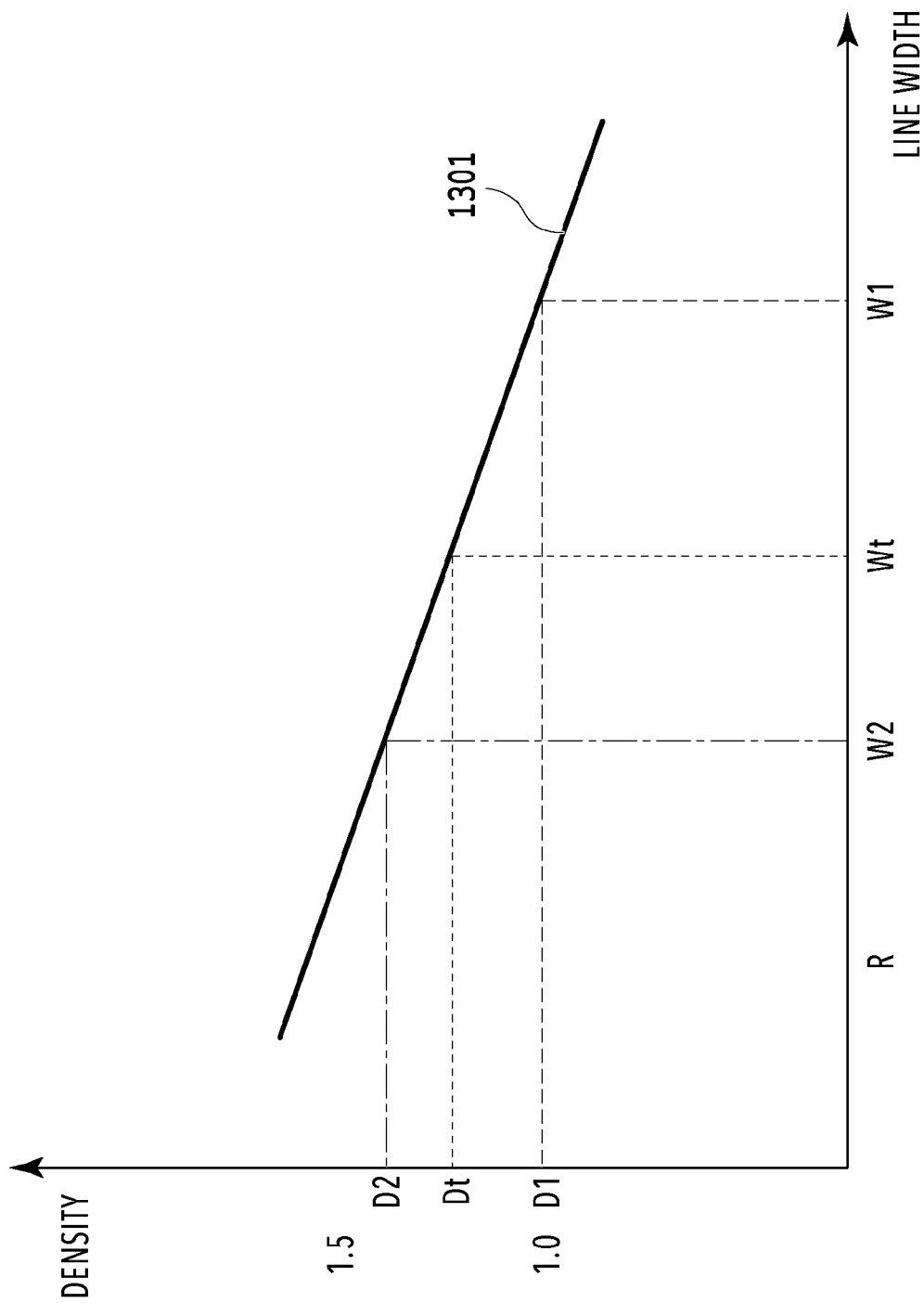
FIG. 13 is a diagram for explaining problems of the prior art.

Here, before explanation of the effect of the present embodiment, the problem of the conventional technique is explained by using FIG. 13. For example, in the method of Japanese Patent Laid-Open No. 2012-108569, the density and the line width are adjusted so that the average density of the entire area in which lines and blanks are included becomes equal. As shown in the example in FIG. 13, in a case when the density in the printing apparatus is D1, which is lower than a density Dt of the target printing apparatus, in order to make the average density equal, in accordance with a relationship indicated by symbol 1301, the line width is set to W1 that is greater than a line width Wt of the target printing apparatus. That is, in the method of Japanese Patent Laid-Open No. 2012-108569, in a case when the average density reproduced by the printing apparatus is different from the average density reproduced by the target printing apparatus, in order to match apparent impressions, a line width different from that of the target printing apparatus is set as a result. Due to this, the apparent impressions of the line portions become close to each other, but information represented by the line width will be lost. Further, with the method of Japanese Patent Laid-Open No. 2012-108569, in a case when the line width becomes greater than that of the target printing apparatus, as a result of reproducing a drawing in which lines concentrate with the line having thickened, the blank between lines becomes narrow, and the blank disappears as the case may be, and, therefore, there is a concern that it is no longer possible to distinguish lines.

In the present embodiment, after a color matching method is determined (after a color matching table is generated), a line width matching method is determined (a line width matching table is generated) by also taking into consideration the dot defect accompanying the area coverage modulation processing, which occurs in a case where the color matching table is used, and the change in the application amount. Consequently, according to the present embodiment, it is possible to perform both the accurate color matching and the accurate line width matching at the same time.

About Modification Example of the Present Embodiment

<<Line Width Adjustment in Accordance with Orientation of Line>>

In the embodiment described previously, adjustment is performed so that the line width becomes the largest irrespective of the orientation of the line, such as the vertical line, the horizontal line, and the oblique line. However, in a case when processing is performed by dividing the lines into the vertical lines, the horizontal lines, and the oblique lines, for example, in the image data analysis processing J03, it is possible to provide the input line width after correction for each of these lines. By doing so, it is possible to match line widths more accurately although the image data analysis load becomes heavy. For example, in a serial ink jet printer, the positional relationship between the main droplet and the satellite is different between the vertical line and the horizontal line, and there is a trend for the line width to become greater along the scanning direction of the carriage. Because of this, the line width adjustment in accordance with the orientation of the line is effective in the case such as this.

<<Line Width Adjustment in Accordance with Color>>

Further, in the embodiment described previously, the line width is specified uniformly irrespective of the output color. However, in a case when the blurring of ink is taken into consideration strictly, the application amount of the secondary color (R, G, B) inks is likely to be greater than the application amount of the primary color (C, M, Y) inks, and, therefore, there is a trend for the secondary color ink to be likely to blur as compared to the primary color ink. Further, resulting from the difference in surface tension for each ink color, the way ink blurs differs for each color, and, therefore, there is a case when the line width changes due to this. Consequently, in a case when it is desired to match line widths strictly by also taking these into consideration, it is possible to perform line width adjustment for each color. For example, it is possible to apply the line width for each color by finding the input line width [mm] after correction for each of 729 (=9×9×9) colors obtained by changing values in units of 32 values for each value (takes one value in a range between 0 and 255) of (R, G, B) and performing tetrahedral interpolation, and the like, for this line width. By doing so, it is possible to meticulously deal with a subtle difference in the line width resulting from a difference in application amount and surface tension for each ink color.

In this case, the order of color matching and line width matching as follows is favorable.

In the embodiment described previously, the line width specifying value of the PDL data is changed before rasterization, and the raster image data for which line width adjustment has been performed is obtained, and color matching is performed for the image data by using the color matching table (see FIG. 2). However, it is also possible to perform color matching for the color specifying data in the PDL data before rasterization by using the color matching table. This aspect is suitable to a case when detailed line width adjustment for each color is performed because it is possible to perform line width adjustment for the image data for which color matching has already been performed.

<Application Range of Line Width Adjustment>

In the embodiment described previously, whether or not the drawing target is a line portion is determined and then the line width adjustment is applied only to the line portion (YES at S1203 in FIG. 12→S1204). However, in order to simplify the entire processing, it may also be possible to similarly apply the line width adjustment also to the solid-painted portion whose area is large. By doing so, it is possible to omit the PDL data analysis and easily perform color matching and line width matching between the printing apparatuses for bitmap data with no attribute.

<<Line Width Adjustment Value>>

In the embodiment described previously, "input line width after correction" is stored in the form of the table in FIG. 10 and corresponding "input line width after correction" is found for each input line width by referring to the table. However, in order to simplify the processing, it is possible to find a uniform offset value irrespective of the input line width and to use the input line width to which the offset value is added as "input line width after correction". For example, in a case when differences between "input line width after correction" and "input line width" of #1 to #8 are found in FIG. 10, the average is 0.64 [mm]. Consequently, as "input line width after correction", it is possible to use "input line width" to which a uniform offset value of 0.64 [mm] is added. By doing so, there is a case when the line width matching accuracy is reduced depending on the line width, but it is no longer necessary to store the input line width after correction in the form of a table, and, therefore, it is possible to reduce the memory capacity.

Further, it is possible to use discrete values as offset values for "input line width". For example, it is possible to use discrete values at N levels where N=20. Specifically, in a case of units of 0.1 [mm], it is possible to represent offset values for "input line width" from −1.0 [mm] to +1.0 [mm] at ten levels for negative values and positive values, respectively. In a case when the offset value for "input line width" is 0.64 [mm], it is assumed that N=+6. By taking discrete values as described above, it is possible to reduce the memory capacity for storing offset values. Further, in a case when a user is caused to input the offset value manually, it is possible for a user to directly select the offset value from a list box from which one of N levels is selected without the need to directly input a figure, and, therefore, it is possible to reduce time and effort of a user for manual input.

<<Method of Line Width Adjustment>>

In the embodiment described previously, the line width adjustment is performed by changing the line width specifying value of the PDL data before rasterization. However, it is also possible to perform the line width adjustment by thinning the dots at the edge portion or on the contrary, to add dots so as to facilitate blurring by modifying a binary dot image immediately before printing in place of PDL data. By directly modifying a binary dot image immediately before printing, it is made possible to perform accurate line width adjustment in units of dots. Further, in a case of a system that uses a reaction liquid, it is possible to adjust the line width by adjusting ON/OFF of the reaction liquid or the overlap amount between the reaction liquid and the color ink.

Furthermore, it is also possible to switch printing directions (that is, bidirectional printing or one-way printing) in a case when a line is printed for line width adjustment control. For example, in a case when a line in a direction perpendicular to the carriage scanning direction is printed, it is possible to increase the line width by performing bidirectional printing in which the main droplet and the satellite are likely to be printed apart from each other or on the contrary, to reduce the line width by suppressing the satellite by performing one-way printing.

OTHER EMBODIMENTS

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

According to the present disclosure, it is made possible to match both colors and line widths with a high accuracy between different printing apparatuses.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus comprising:
one or more processors and at least one memory, wherein the one or more processors according to an instruction stored in the at least one memory is configured to function as:
a first acquisition unit configured to acquire a first color reproduction characteristic indicating a first plurality of reproduction color values for each of a plurality of color values, the first plurality of reproduction color values indicating a color obtained by reproducing the plurality of color values by a first printing apparatus;
a second acquisition unit configured to acquire a second color reproduction characteristic indicating a second plurality of reproduction color values for each of the plurality of color values, the second plurality of reproduction color values indicating a color obtained by reproducing the plurality of color values by a second printing apparatus;
a first generation unit configured to generate color matching information used in a case when color matching is performed between the first printing apparatus and the second printing apparatus based on the first color reproduction characteristic and the second color reproduction characteristic;
a third acquisition unit configured to acquire a first line width characteristic of the first printing apparatus by printing a line width determination chart by the first printing apparatus;
a fourth acquisition unit configured to acquire a second line width characteristic of the second printing apparatus by causing the second printing apparatus to print the line width determination chart with the color matching information; and
a second generation unit configured to generate line width correction information for correcting an input line width for the second printing apparatus based on the first line width characteristic and the second line width characteristic.

2. The information processing apparatus according to claim 1, wherein the first color reproduction characteristic is acquired by printing a plurality of patches on a printing medium by the first printing apparatus based on image data corresponding to the plurality of values and measurement of the first plurality of patches, and the second color reproduction characteristic is acquired by printing a second plurality of patches on a printing medium based on the image data by the second printing apparatus and measurement of the second plurality of patches.

3. The information processing apparatus according to claim 1, wherein, in the line width determination chart, a plurality of images is arrayed, in each of which a plurality of lines having a predetermined width in a first direction and extending in a second direction intersecting the first direction is provided at regular intervals in the first direction and in which an interval between two lines adjacent in the first direction is different from one another.

4. The information processing apparatus according to claim 1, wherein a value of an input line width for the second printing apparatus is a line width specifying value in a PDL format.

5. The information processing apparatus according to claim 1, wherein the correction unit generates a table in which a value for each orientation of a line is stored.

6. The information processing apparatus according to claim 1, wherein the correction unit generates a table in which a value for each color is stored.

7. The information processing apparatus according to claim 1, wherein the second printing apparatus performs line width matching with the first printing apparatus by using a table generated by the correction unit and performs color matching with the first printing apparatus by using the color matching information generated by the generation unit.

8. The information processing apparatus according to claim 1, wherein the second printing apparatus switches between bidirectional printing and one-way printing in accordance with an orientation of a line to be printed.

9. The information processing apparatus according to claim 1, wherein the correction unit corrects a width of a line printed by the second printing apparatus based on data of a line indicating a predetermined color and a predetermined width so that the width of the line printed by the second printing apparatus based on the data is the same as a width of a line printed by the first printing apparatus based on the data.

10. The information processing apparatus according to claim 1, further comprising a storing unit configured to store the line width correction information generated by the second generation unit.

11. The information processing apparatus according to claim 1, wherein the line width correction information generated by the second generation unit is stored in a memory of the second printing apparatus.

12. A method comprising:
a step of acquiring a first color reproduction characteristic indicating a first plurality of reproduction color values for each of a plurality of color values, the first plurality of reproduction color values indicating a color obtained by reproducing the plurality of color values by a first printing apparatus;
a step of acquiring a second color reproduction characteristic indicating a second plurality of reproduction color values for each of the plurality of color values, the second plurality of reproduction color values indicating a color obtained by reproducing the plurality of color values by a second printing apparatus;
a step of generating color matching information used in a case when color matching is performed between the first printing apparatus and the second printing apparatus based on the first color reproduction characteristic and the second color reproduction characteristic;
a step of acquiring a first line width characteristic of the first printing apparatus by printing a line width determination chart by the first printing apparatus;
a step of acquiring a second line width characteristic of the second printing apparatus by causing the second printing apparatus to print the line width determination chart with the color matching information; and
a step of generating line width correction information for correcting an input line width for the second printing apparatus based on the first line width characteristic and the second line width characteristic.

13. The information processing method according to claim 12, wherein the first color reproduction characteristic is acquired by printing a plurality of patches on a printing medium by the first printing apparatus based on image data corresponding to the plurality of values and measurement of the first plurality of patches, and the second color reproduction characteristic is acquired by printing a second plurality of patches on a printing medium based on the image data by the second printing apparatus and measurement of the second plurality of patches.

14. The information processing method according to claim 12, wherein, in the line width determination chart, a plurality of images is arrayed, in each of which a plurality of lines having a predetermined width in a first direction and extending in a second direction intersecting the first direction is provided at regular intervals in the first direction and in which an interval between two lines adjacent in the first direction is different from one another.

15. The information processing method according to claim 12, wherein a value of an input line width for the second printing apparatus is a line width specifying value in a PDL format.

16. The information processing method according to claim 12, wherein the correction step generates a table in which a value for each orientation of a line is stored.

17. The information processing method according to claim 12, wherein the correction step generates a table in which a value for each color is stored.

18. The information processing method according to claim 12, wherein the second printing apparatus performs line width matching with the first printing apparatus by using a table generated by the correction step and performs color matching with the first printing apparatus by using the color matching information generated by the generation step.

19. The information processing method according to claim 12, wherein the second printing apparatus switches between bidirectional printing and one-way printing in accordance with an orientation of a line to be printed.

20. The information processing method according to claim 12, wherein the correction step corrects a width of a line printed by the second printing apparatus based on data of a line indicating a predetermined color and a predetermined width so that the width of the line printed by the second printing apparatus based on the data is the same as a width of a line printed by the first printing apparatus based on the data.

21. The information processing method according to claim 12, further comprising a storing step for storing the line width correction information generated by the second generation step.

22. The information processing method according to claim 12, wherein the line width correction information generated by the second generation step is stored in a memory of the second printing apparatus.

23. A non-transitory computer readable storage medium storing a program for causing a computer to perform a method comprising:
a step of acquiring a first color reproduction characteristic indicating a first plurality of reproduction color values for each of a plurality of color values, the first plurality of reproduction color values indicating a color obtained by reproducing the plurality of color values by a first printing apparatus;

a step of acquiring a second color reproduction characteristic indicating a second plurality of reproduction color values for each of the plurality of color values, the second plurality of reproduction color values indicating a color obtained by reproducing the plurality of color values by a second printing apparatus;

a step of generating color matching information used in a case when color matching is performed between the first printing apparatus and the second printing apparatus based on the first color reproduction characteristic and the second color reproduction characteristic;

a step of acquiring a first line width characteristic of the first printing apparatus by printing a line width determination chart by the first printing apparatus;

a step of acquiring a second line width characteristic of the second printing apparatus by causing the second printing apparatus to print the line width determination chart with the color matching information; and a step of generating line width correction information for correcting an input line width for the second printing apparatus based on the first line width characteristic and the second line width characteristic.

* * * * *